Patented May 15, 1951

2,553,064

UNITED STATES PATENT OFFICE 2,553,064

SURFACING AND CLEANING ALUMINUM BAKEPANS

Henry A. Snyder, Kansas City, Mo.

No Drawing. Application May 19, 1949,
Serial No. 94,255

5 Claims. (Cl. 41—42)

The present invention relates to the surfacing and cleaning of aluminum and aluminum alloy bake pans and more particularly of bread pans, bun pans, cake pans and the like, as used by commercial bakeries and on which silicone-type resin pan glazes have been employed instead of grease to prevent sticking of the dough to the pan during the baking cycle.

In baking bread and other bakery products, it has been proposed that pan glazes of silicone-type resins be employed instead of grease to prevent adhesion of the dough to the pan during the baking operation. Such glazes, which are applied to the pan usually by spraying and are thermally set before use in baking, have the advantage that they do not require greasing before the baking operations and may be employed repeatedly before cleaning and renewal. In order to be competitive with grease and for economical use of such glazes, pans treated therewith should be capable of use for about two hundred complete baking operations or cycles before it is necessary to clean and renew them. However, in the use of such glazes it has not been possible to secure even approximately this number of operations without renewal of the glaze except with new pans. After the first use of the pan, with the cleaning methods hitherto employed, inadequate cleaning is secured, or if the cleaning process is continued sufficiently long to ensure complete removal of the glaze, excessive etching and loss of the aluminum occurs. This results not only in excessive wear of the pans but also in irregular and uneven surfacing of the aluminum, causing irregularities on reglazing that markedly reduce the number of times which the reglazed pan may be employed before further cleaning and reglazing is required. Thus, in general, in reglazing and re-use of the pans, much less than 200 baking cycles are secured, often less than 100.

Furthermore, the excessive and irregular etching and roughening of the surface of the aluminum, even after reglazing, causes excessive sticking of the dough, uneven heating, and coloring of the surface of the bread during baking. If, in the effort to avoid excessive etching and roughening of the surface of the aluminum, the glaze is incompletely removed, this likewise leaves irregular spots on the surface of the pan which cause difficulty in baking and various defects in the bread or baked product. Also, in using the cleaning methods hitherto employed, the number of rejects or pans which are incapable of re-use without again being put through the cleaning operation is excessive, amounting to as much as 5 to 10%.

In the cleaning methods hitherto used, solutions of alkalies or alkaline salts such as sodium carbonate, trisodium phosphate and sometimes sodium metasilicate have been employed. As the cleaning solution is kept at a high temperature, generally at its boiling point, during the cleaning operation, concentration of the solution occurs and it becomes excessively caustic and corrosive with respect to the aluminum or aluminum alloy of the pans and also may cause serious burns on the skin of the operators and destruction of their clothing. As the cleaning solution becomes more concentrated through loss of water, it is diluted occasionally with water to restore its original volume, and occasionally the soda, caustic or other chemical used is added to compensate for that used in the cleaning operation. With such cleaning solutions, handled as they are generally by unskilled operators, there are wide variations in the efficiency of cleaning and the extent of attack on the aluminum of the pan with the constantly occurring variations in concentration of the alkali.

In accordance with the present invention, an acid cleaning and surfacing solution is employed instead of the alkaline solutions hitherto used. Various acid materials have been tried by applicant in the course of his experiments, but in general it has been found that they cause excessive corrosion, etching or discoloration of the aluminum, leave an unsatisfactory surface, or act with too great violence and speed. Furthermore, for the most part, such acid cleaning agents are corrosive to the skin and clothing of the operators, require great care in maintaining a fairly constant concentration and permit little variation in time of treatment in order to avoid excessive loss of aluminum. In practice the amount of aluminum removed in each cleaning treatment should not exceed about 0.7 mg. per sq. cm. and preferably should not exceed about 0.35 to 0.53 mg. per sq. cm. Less removal of aluminum is desirable, if adequate cleaning and proper surface characteristics can be secured.

It has been found, in accordance with the present invention, that water soluble inorganic bisulfates of the class including the alkali metal bisulfates and ammonium bisulfate, in aqueous solution, are peculiarly adapted for use as a cleaning and surfacing solution for aluminum bake pans treated with silicone-type resin glazes as well as for initially preparing the surface of such aluminum bake pans for use. The solutions, as in the case of the alkaline cleaning solutions hitherto used, are used hot, say at 150° F. or higher, and preferably at substantially its boiling point.

Thus it has been found that with aqueous sodium bisulfate solutions, wide variations both in concentration and in time of treatment are permissible without excessive loss of aluminum while securing adequate cleaning and removal of the glaze, grease and other foreign material and at the same time securing a uniform, satin-like finish on the aluminum surface. Thus, with 10 minutes' cleaning time, and with a variation in concentration of the cleaning solution of from 5% to 20%, the loss in weight of aluminum varies only from about 0.27 to 0.33 mg. per sq. cm. or an increase of only 22.2%. At any selected cleaning time the rate of loss decreases with increasing concentration after one or two minutes. On the other hand, with the solution maintained at, say, 10% concentration, with a variation in cleaning time from 10 minutes to 20 minutes, the loss in aluminum ranged from 0.28 to 0.5 mg. per sq. cm. The proportionately greater part of the loss at all concentrations occurs in the first one-half to one minute. Thus, in the first minute at 10% concentration, the loss is about 0.12 mg. per sq. cm. It has been found that with concentrations of the sodium bisulfate ranging from 5% to 20% and with cleaning times ranging from 5 minutes to 30 minutes satisfactory cleaning is secured, depending upon the extent of deposits on the bake pan during the preceding baking operations and with the loss in weight of the aluminum by corrosion or etching held well below 0.7 mg. per sq. cm.

Tests conducted with aqeous solutions of ammonium bisulfate and with other alkali metal bisulfates, such as potassium bisulfate, show that they produce substantially the same results as do solutions of sodium bisulfate when used in similar concentrations. With bisulfates of metals of higher atomic weight than potassium, the concentration of the salt should be slightly increased for comparable results, to secure concentrations of the bisulfate fraction of the compound in the solution corresponding approximately to that present in the sodium bisulfate solution with which comparison is being made.

Solutions of soluble bisulfates are thus well adapted for use in the cleaning operation, particularly by unskilled operators and where, while a general time limit may be set for the cleaning operation, additional time may be permitted if required for securing thorough cleaning.

Thus, the cleaning solution employed may be basically a 10% solution of the sodium bisulfate. Ordinarily a tank of substantial size is employed, which may be either a ceramic tank or a tank lined with lead or other suitable non-corrosive material. The operator is instructed as to the number of pounds of sodium bisulfate to be used with the tank filled to a given level, a suitable strength of solution for use being 10%. He is likewise advised as to the length of time which should ordinarily be required for cleaning, say 25 minutes for new pans, which have a drawn or mirror-like finish and still have some of the drawing lubricant on the surface; or he may be advised that a time of 15 minutes should be employed for pans which have been glazed and used in baking. He may also be advised that the time of treatment may be extended to whatever time is necessary to secure thorough cleaning, not to exceed 30 minutes. The ordinary variations in concentrations which occur in use of the solution, which is maintained at boiling temperature, do not then have untoward effects in causing excessive etching, nor will the wasting of the solution and the decrease in concentration resulting from using up the bisulfate have marked deleterious effects. The operator can be instructed to add water as needed to maintain the level of the cleaning solution in the tank and to add sodium bisulfate in proportion to the number of pans which have been cleaned, thus maintaining an approximate uniformity of composition of the solution. The same procedure may, of course, be employed with other bisulfate solutions in accordance with the present invention.

The action of the sodium bisulfate and other water-soluble bisulfates in accordance with this invention, differing from that of other acid materials and from that of the alkalies in common use, results in a uniform, satin-like, etched surface of the aluminum or aluminum alloy which has been found greatly superior to the bright, mirror-like finish of new pans and to the rough, unevenly etched or blackened surfaces resulting from the use of alkaline or of other acid materials. The satin-like surface resulting from the use of the sodium bisulfate has been found particularly desirable in bake pans. It accepts the silicone-type resin glaze readily and smoothly and with a single coating of such glaze, pans cleaned by the present process will give well in excess of two hundred baking cycles before cleaning is again necessary, thus giving better results than new untreated pans. Transmission of heat through the pan is superior to that secured either with new pans or with recleaned pans which have been treated by the methods hitherto used, and the crust of bread or other goods baked in pans surfaced or cleaned in accordance with the present invention is more uniform and slightly darker than that previously secured. Furthermore, the bread dumps cleanly and easily from the pans surfaced or cleaned in accordance with the present invention and no jarring or banging of the pans is necessary for the removal of the bread.

It is frequently the case that the bake pans to be treated in accordance with the present invention are fastened together in sets by means of iron or steel straps. In such case, a suitable acid inhibitor such as is commonly used in inhibiting the attack of acid pickling agents on steel may be employed in small proportions, say from 0.25% to 3.0%. Suitable inhibitors which may be employed are, for example, the dibutyl and diethyl thioureas such as those now commercially available from the Sharples Chemical Company and known as inhibitors Nos. 1143 and 1148, respectively.

The present invention may be employed in the surface treatment of new aluminum bake pans after drawing, suitably after the ordinary rinsing or cleansing of such pans. The aluminum bake pans, after being drawn, have a hard, smooth surface, sometimes mirror-like in appearance, and may have on their surfaces residual films or spots of the drawing compound used in the manufacture of the pans. Such pans give poor heat transmission and often cause sticking and uneven surface coloration of the baked goods prepared in them, as a result of the high and sometimes uneven reflection of heat from the bright, mirror-like surfaces. By treatment with sodium bisulfate solution in accordance with the present invention, such pans are not only thoroughly cleansed, but are given a very fine grained, satin-like, etched surface which transmits heat uniformly and gives even coloration of the surfaces of the baked goods in contact with the pans. Such pans, surfaced in accordance with the present invention, may be employed with the ordinary greases or oils instead of silicone-type resin glazes, if desired.

While reference has been made in the preceding application to aluminum bake pans, it will be understood that under this term there are included pans made of alloys principally of aluminum, such as alloys containing minor proportions up to, say, 2.5 to 3.0% of other metals, such as beryllium, magnesium, chromium or other alloying metals. Thus, an aluminum alloy in common use in making bake pans is one termed in the trade a "quarter-hard aluminum" and contains 97.25% aluminum, 2.5% magnesium and 0.25% chromium.

The silicone-type thermosetting resins used as bake pan glazes are in general poly-siloxane resins. One such glaze, for example, is sold by Dow-Corning Corporation under the name "D. C. Pan Glaze" as a 15% solution of the partially polymerized resin in an aromatic solvent.

Although the present invention has been described in connection with details of specific examples thereof, it is to be understood that the invention is not to be regarded as limited to such details, except insofar as included in the accompanying claims.

I claim:

1. The method of surfacing and cleansing aluminum bake pans which comprises subjecting such pans to the action of a solution of sodium bisulfate of a concentration of from about 5% to about 20% at temperatures of from about 150° F. to the boiling point of the solution.

2. The method of cleansing and surfacing aluminum bake pans which comprises maintaining a heated bath of aqueous solution of sodium bisulfate of about 10% concentration, immersing the bake pans therein for from 5 to 30 minutes, and maintaining the concentration of the said solution by the addition thereto of water and of sodium bisulfate.

3. The method of surfacing and cleansing aluminum pans which comprises maintaining a bath of an aqueous solution of a water soluble inorganic bisulfate of the class consisting of the alkali metal bisulfates and ammonium bisulfate, of a concentration of about 5% to about 20%, at a temperature of from about 150° F. to the boiling point of the solution, and immersing the bake pans therein for a period of about 5 to 30 minutes.

4. The method of cleaning used aluminum bake pans having a surface glaze of a silicone-type resin which comprises maintaining a bath of an aqueous solution of a water soluble inorganic bisulfate of the class consisting of the alkali metal bisulfates and ammonium bisulfate, of a concentration of about 5% to about 20%, at a temperature of from about 150° F. to the boiling point of the solution, and immersing the bake pans therein for a period of about 5 to 30 minutes.

5. The method of surfacing and cleansing aluminum bake pans which comprises maintaining a bath of an aqueous solution of an alkali metal bisulfate, of a concentration of about 5% to about 20%, at a temperature of from about 150° F. to the boiling point of the solution, and immersing the bake pans therein for a period of about 5 to 30 minutes.

HENRY A. SNYDER.

REFERENCES CITED

The following references are of record in the file of this patent:

UNITED STATES PATENTS

| Number | Name | Date |
|---|---|---|
| 2,018,388 | Tosterud | Oct. 22, 1935 |
| 2,470,593 | Webb | May 17, 1949 |